United States Patent
Wang et al.

(10) Patent No.: US 7,330,609 B2
(45) Date of Patent: Feb. 12, 2008

(54) MTF MEASURING METHOD AND SYSTEM

(75) Inventors: Xueli Wang, Beijing (CN); Xiongwei Yan, Beijing (CN); Wei Ding, Beijing (CN); Makoto Gohno, Tokyo (JP)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 628 days.

(21) Appl. No.: 10/981,916

(22) Filed: Nov. 4, 2004

(65) Prior Publication Data
US 2005/0100244 A1 May 12, 2005

(30) Foreign Application Priority Data
Nov. 6, 2003 (CN) .................... 2003 1 0119694

(51) Int. Cl.
G06K 9/56 (2006.01)
H01L 27/146 (2006.01)
(52) U.S. Cl. .................. 382/308; 382/131; 382/300; 250/370.09
(58) Field of Classification Search ........ 382/131–132, 382/254, 257, 280, 281, 286, 298–300, 308; 250/370.11, 370.09; 356/124.5
See application file for complete search history.

(56) References Cited

U.S. PATENT DOCUMENTS

| | | | |
|---|---|---|---|
| 4,097,793 A | | 6/1978 | Shapiro et al. |
| 4,132,654 A | | 1/1979 | Braun |
| 4,239,395 A | | 12/1980 | Modisette |
| 4,331,021 A | * | 5/1982 | Lopez et al. .................. 73/1.86 |
| 4,394,737 A | * | 7/1983 | Komaki et al. ............... 378/23 |
| 5,191,621 A | * | 3/1993 | Brok .......................... 382/100 |
| 5,657,400 A | * | 8/1997 | Granfors et al. ............ 382/254 |
| 5,745,548 A | | 4/1998 | Dobbs et al. |
| 5,760,403 A | * | 6/1998 | Elabd .................... 250/370.11 |
| 5,959,726 A | * | 9/1999 | Riley et al. .............. 356/124.5 |
| 6,233,349 B1 | | 5/2001 | Gravelle et al. |
| 6,490,336 B1 | | 12/2002 | Suess et al. |
| 6,694,047 B1 | * | 2/2004 | Farrokhnia et al. ......... 382/132 |
| 6,895,077 B2 | * | 5/2005 | Karellas et al. ............ 378/98.3 |

OTHER PUBLICATIONS

Yoshinori Iwai, Series of Advancements in Electronic Engineering No. 9 CT Scanner—X-Ray Computed Tomography System, Corona Publishing Co., Ltd., May 1980, pp. 66-68.

* cited by examiner

*Primary Examiner*—Kanjibhai Patel
(74) *Attorney, Agent, or Firm*—Armstrong Teasdale LLP

(57) ABSTRACT

A method of measuring a modulation transfer function (MTF) includes detecting the center of a line spread function (LSF) image in order to calculate an MTF. For this purpose, an enlarged image of a portion of an image containing the LSF image is created, and binary-coded based on a threshold. A morphological operation is performed on the binary-coded image. Coordinates representing points that define the contour of the resultant image are sampled, and used to work out coordinates representing the center of a circle through Hough transform. The coordinates representing the center are transformed into coordinates representing a point in an original image.

8 Claims, 6 Drawing Sheets

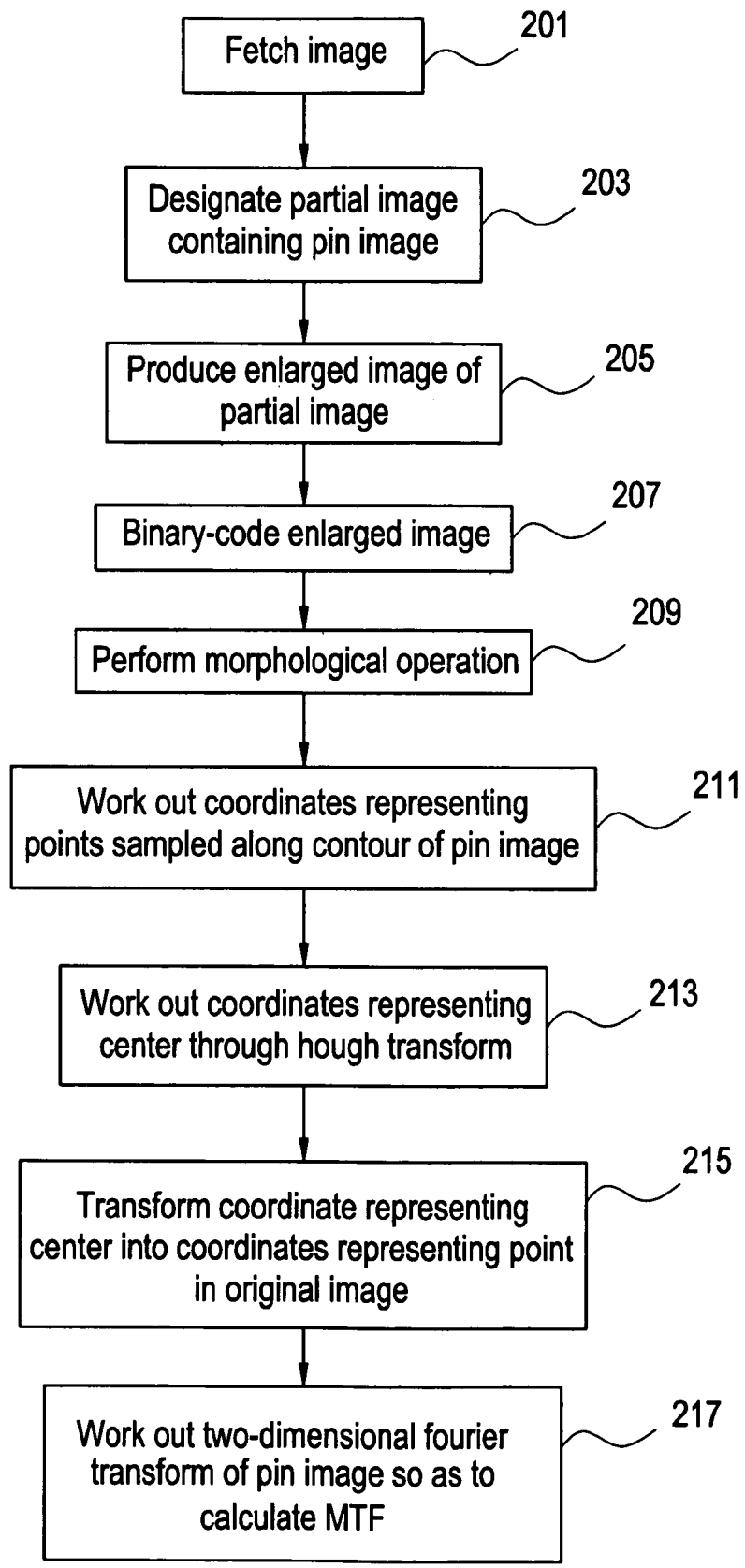

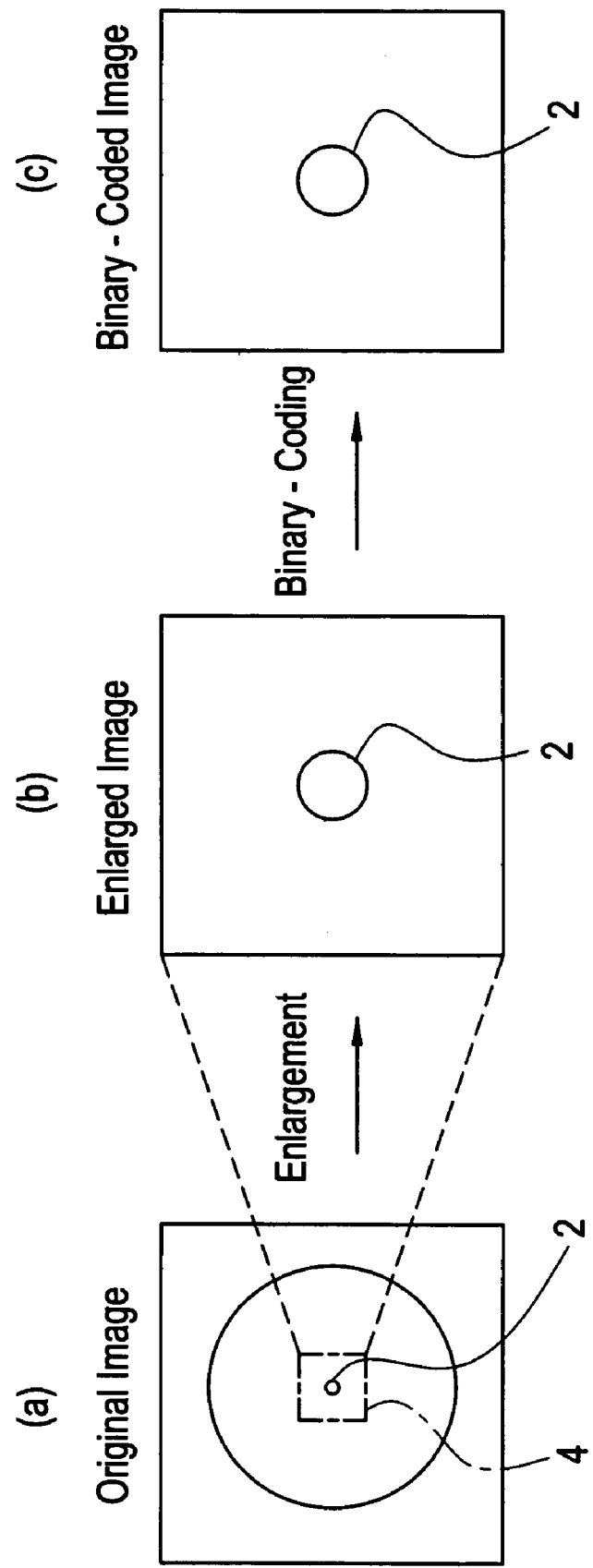

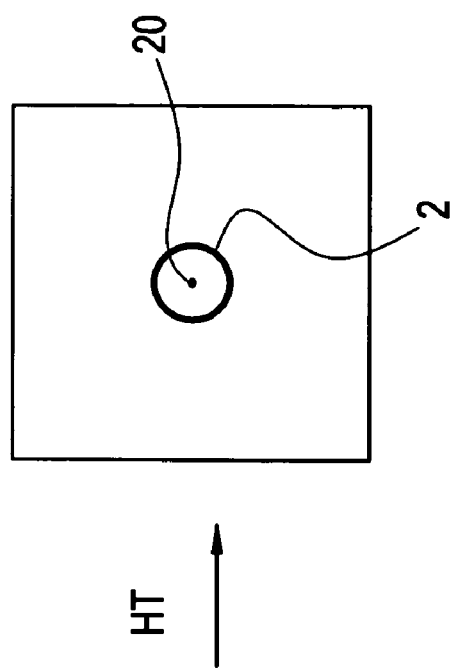
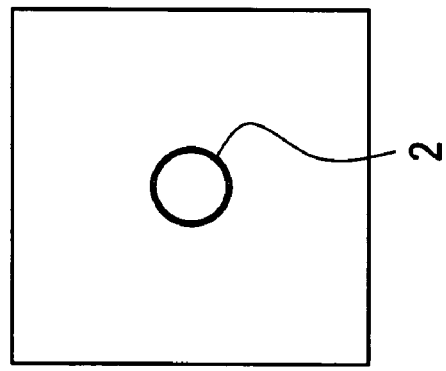
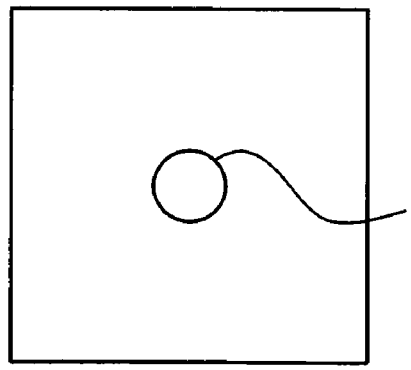

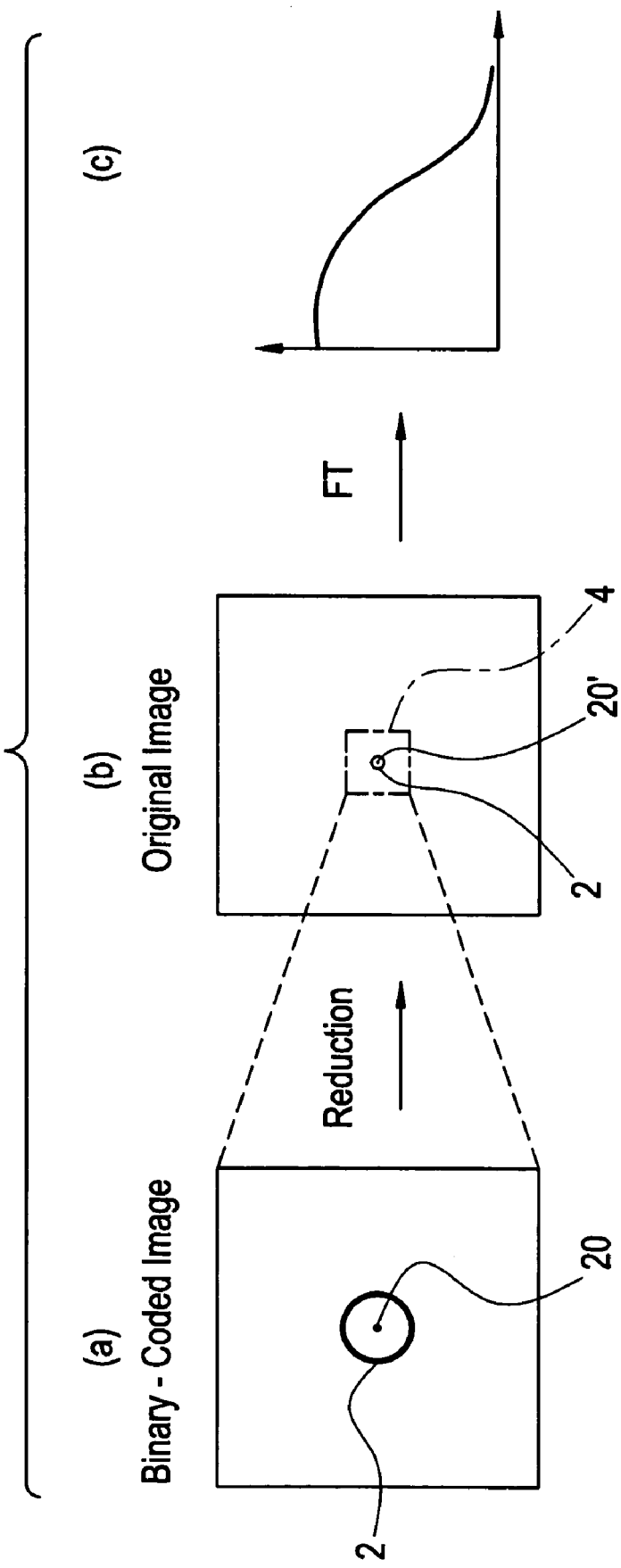

MTF MEASURING METHOD AND SYSTEM

CROSS REFERENCE TO RELATED APPLICATIONS

This application claims the benefit of Chinese Application No. 200310119694.2 filed Nov. 6, 2003.

BACKGROUND OF THE INVENTION

The present invention relates to an MTF (modulation transfer function) measuring method and system. More particularly, the present invention relates to a method and system for calculating an MTF by Fourier-transforming an LSF (line spread function).

An MTF stands for a modulation transfer function, and indicates the spatial resolution of an image reconstructed by an X-ray computed tomography (CT) system. The MTF is therefore utilized in order to assess the performance of the X-ray CT system. The MTF is calculated by Fourier-transforming an LSF (line spread function) detected in the reconstructed image (refer to, for example, Non-patent Document 1).

[Non-patent Document 1] "Series of Advancements in Electronic Engineering No. 9 CT Scanner—X-ray Computed Tomography System" written by Yoshinori Iwai (Corona Publishing Co., Ltd., May in 1980, P. 66-P. 68).

In order to calculate an MTF highly precisely, it is essential to detect the center of an LSF accurately. The center of an LSF is detected as a point in an LSF image which exhibits the largest pixel value. Since the detected center position is likely to contain an error because of the influence of noise, there is therefore difficulty in measuring the MTF highly precisely.

SUMMARY OF THE INVENTION

Therefore, an object of the present invention is to provide a method and system for highly precisely measuring an MTF.

(1) In one aspect of the present invention for accomplishing the above object, there is provided a method for detecting the center of an LSF image contained in a tomographic image produced by an X-ray CT system, and working out a two-dimensional Fourier transform of the LSF image with the center as a reference so as to thus calculate an MTF. For the detection of the center, an enlarged image of the LSF image contained in the tomographic image is created, and binary-coded based on a threshold. A morphological operation is performed on the binary-coded image. Coordinates representing points sampled along the contour of the resultant image are worked out, and used to calculate coordinates representing the center of a circle through Hough transform. The coordinates representing the center are transformed into coordinates representing a point in the tomographic image.

(2) In the other aspect of the present invention for accomplishing the aforesaid object, there is provided an MTF measuring system comprising: a detecting means for detecting the center of an LSF image contained in a tomographic image produced by an X-ray CT system; and a calculating means for calculating an MTF by working out a two-dimensional Fourier transform of the LSF image with the center as a reference. The detecting means creates an enlarged image of a portion of the tomographic image containing the LSF image, binary-codes the enlarged image on the basis of a threshold, performs a morphological operation on the binary-coded image, and works out coordinates representing points sampled on the contour of the resultant image. The coordinates representing points that define the contour are used to work out coordinates representing the center of a circle through Hough transform. The coordinates representing the center are transformed into coordinates representing a point in the tomographic image. Thus, the center of the LSF is detected.

In the foregoing aspects, an enlarged image of a portion of a tomographic image containing an LSF image is created, and binary-coded based on a threshold. A morphological operation is then performed on the binary-coded image. Coordinates representing points that define the contour of the resultant image are sampled, and used to work out coordinates representing the center of a circle through Hough transform. The coordinates representing the center are transformed into coordinates representing a point in the tomographic image. Consequently, the center of the LSF image can be detected accurately. Eventually, an MTF can be measured highly precisely.

Preferably, the enlarged image is created by interpolating pixels so that the enlarged image will be an appropriate one. Preferably, the interpolation is linear interpolation in terms of simple calculation. Preferably, the threshold is variable in terms of appropriate binary-coding.

According to the present invention, there are provided a method and system for highly precisely measuring an MTF.

Further objects and advantages of the present invention will be apparent from the following description of the preferred embodiments of the invention as illustrated in the accompanying drawings.

BRIEF DESCRIPTION OF THE DRAWINGS

FIG. 2 is a flowchart describing actions to be performed by the MTF measuring system.

FIG. 3 includes conceptual diagrams concerning image processing.

FIG. 4 includes conceptual diagrams concerning image processing.

FIG. 5 includes conceptual diagrams concerning image processing.

DETAILED DESCRIPTION OF THE INVENTION

Figure 1:
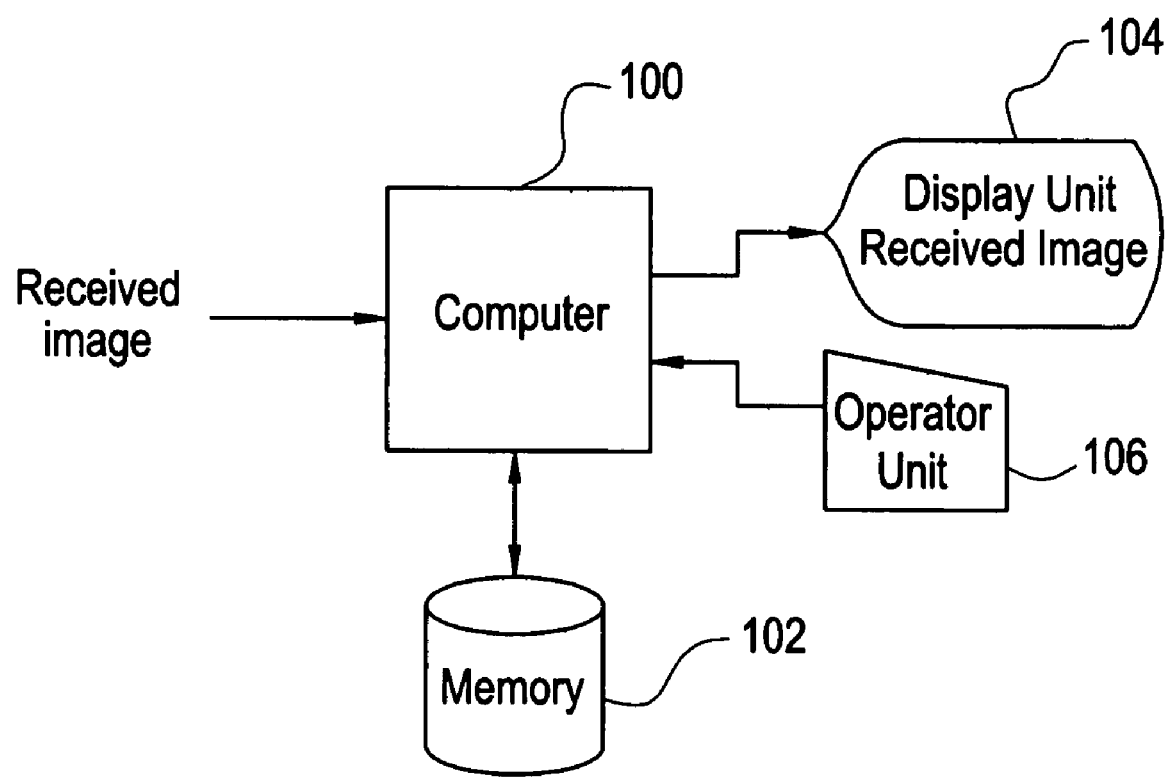
FIG. 1 is a block diagram of an MTF measuring system.

Referring to drawings, an embodiment of the present invention will be described below. FIG. 1 is a block diagram showing an MTF measuring system. The MTF measuring system is an example of the embodiment of the present invention. The components of the MTF measuring system signify an example of an MTF measuring system in accordance with the embodiment of the present invention. The actions of the MTF measuring system signify an example of an MTF measuring system in accordance with the embodiment of the present invention.

As shown in FIG. 1, the MTF measuring system includes a computer 100. The computer 100 receives an image, and includes a memory 102. The received image is stored in the memory 102. Moreover, various data items and programs to be used by the computer 100 are stored in the memory 102. The computer 100 runs the programs stored in the memory 102, whereby various kinds of data processing concerning MTF measurement are carried out.

The computer 100 also includes a display unit 104 and an operator unit 106. An image or other information sent from the computer 100 is displayed on the display unit 104. A user handles the operator unit 106 so as to enter various directives or information items that are transferred to the computer 100. The user uses the display unit 104 and operator unit 106 to operate the MTF measuring system interactively.

The actions of the MTF measuring system will be described below. FIG. 2 is a flowchart describing the actions. The actions are performed when the computer 100 runs the programs stored in the memory 102.

As described in FIG. 2, an image is fetched at stage 201. Consequently, an image like, for example, the one shown in FIG. 3a is stored in the memory 102 and displayed on the display unit 104. The image is a tomographic image produced by imaging a phantom using an X-ray CT system. The tomographic image is a halftone image.

The phantom is designed for MTF measurement and has a pin whose section is shaped like a circle. The tomographic image therefore contains an image 2 rendering the section of the pin. The contour of the image 2 rendering the section of the pin is circular. A profile of pixels sampled along the diameter of the image 2 rendering the section of the pin is equivalent to an LSF. The image 2 rendering the section of the pin is an example of an LSF image employed in the embodiment of the present invention. Hereinafter, the image rendering the section of the pin may be called a pin image.

At stage 203, a partial image containing the pin image 2 is designated within the tomographic image. The partial image is designated based on the user's handling. Consequently, for example, a partial image 4 defined with a dot-dash line is designated. The partial image 4 is designated so that the pin image 2 will be generally located in the center thereof.

At stage 205, an enlarged image of the partial image 4 is created. Consequently, an enlarged image like, for example, the one shown in FIG. 3b is created. The enlarged image may be displayed on the display unit 104 so that a user can view it.

For the creation of an enlarged image, the matrix size of the partial image 4 is enlarged. Moreover, pixels interpolated from pixels constituting the original image are assigned to newly added pixel locations. The interpolation is, for example, linear interpolation. However, the present invention is not limited to linear interpolation. Alternatively, second-order or higher-order interpolation will do. Nevertheless, since linear interpolation is simple, only a small load is imposed on the computer.

At stage 207, the enlarged image is binary-coded. The binary-coding is performed using a predetermined threshold. Consequently, a binary-coded image like, for example, the one shown in FIG. 3c is produced. The binary-coded image may be displayed on the display unit 104 so that a user can view it. In this case, the threshold is made variable so that the user can optimize the binary-coded image by changing the threshold.

At stage 209, a morphological operation is carried out. The morphological operation is one of mathematical morphological techniques, and well-known in the field of image processing technologies.

Erosion/dilation is performed as the morphological operation. Otherwise, opening/closing may be substituted for the erosion/dilation.

The above operations remove a fine structure portion of an image or an irregular structure portion thereof so as to make a basic structure thereof conspicuous. By performing this kind of operation, the irregularity in the contour of the binary-coded pin image 2 deriving from noise or the like is removed. The original circular contour becomes more conspicuous.

FIG. 4a and FIG. 4b conceptually show the states of the pin image 2 attained before and after the morphological operation is performed. FIG. 4a shows the state thereof attained before the morphological operation is performed, and FIG. 4b shows the state thereof attained thereafter.

At stage 211, coordinates representing points that define the contour of the pin image are sampled and used to work out coordinates representing the center of a circle through Hough transform. Herein, the Hough transform is a known technique employed in the field of image processing technologies.

Owing to the Hough transform, the coordinates representing the center 20 of the pin image 2 are determined at stage 213 and as shown in FIG. 4c. Since the circular contour of the pin image 2 has been clarified through the morphological operation, the determined coordinates representing the center are highly precise.

At stage 215, the coordinates representing the center are transformed into coordinates representing a point in the original image. The coordinate transform is, as shown in FIG. 5a and FIG. 5b, achieved by reducing the size of the enlarged image to the size of the original image that is the partial image 4. Consequently, the accurate coordinates representing the center 20' of the pin image 2 contained in the original image are determined.

At stage 217, a two-dimensional Fourier transform of the pin image is worked out in order to thus calculate an MTF. The two-dimensional Fourier transform is performed with the coordinates representing the center 20' as reference values. This results in, as shown in FIG. 5c, an MTF. The coordinates representing the center 20' of the pin image 2 are so accurate that a high-precision MTF can be calculated.

Figure 6:
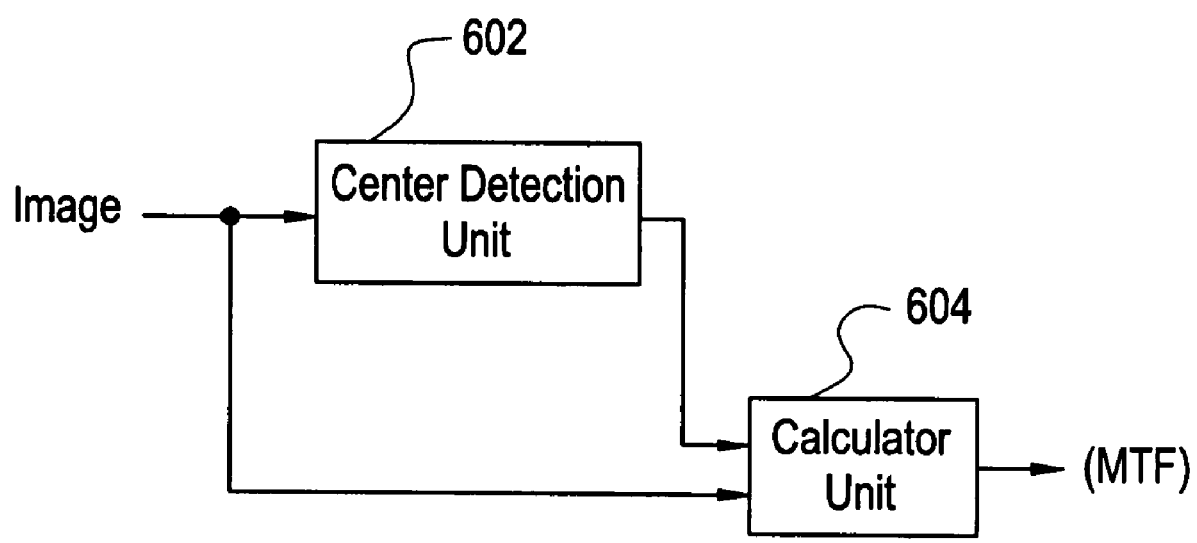
FIG. 6 is a functional block diagram of the MTF

FIG. 6 is a functional block diagram of the MTF measuring system performing the foregoing actions. As shown in FIG. 6, the MTF measuring system includes a center detection unit 602 and a calculation unit 604. The center detection unit 602 detects the coordinates representing the center of an LSF image contained in a received image, and transfers the coordinates to the calculation unit 604. The calculation unit 604 uses the received coordinates representing the center as reference values to work out a two-dimensional Fourier transform of the LSF image contained in the received image, and thus calculates an MTF.

The center detection unit 602 is equivalent to the facility of the computer 100 that performs the actions at stages 201 to 215. The center detection unit 602 is an example of a detecting means included in the present invention. The calculation unit 604 is equivalent to the facility of the computer 100 that performs the action at stage 217. The calculation unit 604 is an example of a calculating means included in the present invention.

Many widely different embodiments of the invention may be configured without departing from the spirit and the scope of the present invention. It should be understood that the present invention is not limited to the specific embodiments described in the specification, except as defined in the appended claims.

The invention claimed is:

1. An MTF measuring method comprising the steps of:
   detecting a center of an LSF (line spread function) image contained in a tomographic image produced by an X-ray CT system; and working out a two-dimensional Fourier transform of the LSF image with the center as a reference so as to thus calculate an MTF (modulation transfer function), wherein:

in order to detect the center, an enlarged image of a portion of the tomographic image containing the LSF image is created;

the enlarged image is binary-coded based on a threshold;

a morphological operation is performed on the binary-coded image;

coordinates representing points that define the contour of the image resulting from the morphological operation are sampled;

the coordinates representing points that define the contour are used to work out coordinates representing the center of a circle through Hough transform; and the coordinates representing the center are transformed into coordinates representing a point in the tomographic image.

2. An MTF measuring method according to claim 1, wherein the enlarged image is created by interpolating pixel values.

3. An MTF measuring method according to claim 2, wherein the interpolation is linear interpolation.

4. An MTF measuring method according to claim 1, wherein the threshold is variable.

5. An MTF measuring system comprising:

a detecting device for detecting a center of an LSF (line spread function) image contained in a tomographic image produced by an X-ray CT system; and a calculating device for calculating an MTF (modulation transfer function) by working out a two-dimensional Fourier transform of the LSF image with the center as a reference, wherein:

in order to detect the center, the detecting device creates an enlarged image of a portion of the tomographic image containing the LSF image;

the detecting device then binary-codes the enlarged image on the basis of a threshold;

the detecting device then performs a morphological operation on the binary-coded image;

the detecting device then samples coordinates representing points that define the contour of the image resulting from the morphological operation;

the detecting device then uses the coordinates representing points that define the contour to work out coordinates representing the center of a circle through Hough transform; and the detecting device then transforms the coordinates representing the center into coordinates representing a point in the tomographic image.

6. An MTF measuring system according to claim 5, wherein the detecting device creates the enlarged image by interpolating pixel values.

7. An MTF measuring system according to claim 6, wherein the interpolation is linear interpolation.

8. An MTF measuring system according to claim 5, wherein the threshold is variable.

* * * * *